(12) United States Patent
Spix

(10) Patent No.: US 9,739,180 B2
(45) Date of Patent: Aug. 22, 2017

(54) VARIABLE TENSIONING FOR ENGINE CAMSHAFT DRIVE

(71) Applicant: GM GLOBAL TECHNOLOGY OPERATIONS LLC, Detroit, MI (US)

(72) Inventor: Thomas A. Spix, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 167 days.

(21) Appl. No.: 14/820,741

(22) Filed: Aug. 7, 2015

(65) Prior Publication Data

US 2017/0037744 A1 Feb. 9, 2017

(51) Int. Cl.
*F01L 1/02* (2006.01)
*F16H 7/08* (2006.01)
*F01L 1/047* (2006.01)

(52) U.S. Cl.
CPC ............... *F01L 1/024* (2013.01); *F16H 7/08* (2013.01); *F01L 1/022* (2013.01); *F01L 1/047* (2013.01); *F01L 2250/02* (2013.01); *F01L 2250/04* (2013.01); *F01L 2820/042* (2013.01); *F16H 2007/0812* (2013.01); *F16H 2007/0872* (2013.01); *F16H 2007/0885* (2013.01)

(58) Field of Classification Search
CPC . F01L 1/022; F01L 1/024; F01L 1/047; F01L 2250/02; F01L 2250/04; F01L 2820/042
USPC ...................................................... 123/90.31
See application file for complete search history.

(56) References Cited

U.S. PATENT DOCUMENTS

| | | | | |
|---|---|---|---|---|
| 5,065,709 A * | 11/1991 | Ito | ............................ | F01L 1/02 123/90.15 |
| 5,109,813 A * | 5/1992 | Trzmiel | .................. | F01L 1/348 123/90.15 |
| 5,297,508 A * | 3/1994 | Clarke | .................... | F01L 1/348 123/90.17 |
| 6,213,072 B1 * | 4/2001 | Sayama | .................. | F01L 1/024 123/192.2 |
| 6,308,679 B1 * | 10/2001 | Nakamura | ................ | F01L 1/02 123/195 C |
| 6,746,352 B1 * | 6/2004 | Poiret | ....................... | F01L 1/02 474/101 |
| 7,444,971 B2 * | 11/2008 | Suga | ......................... | F01L 1/34 123/90.15 |
| 2001/0003279 A1 * | 6/2001 | Brandl | ...................... | F01L 1/02 123/90.31 |

(Continued)

*Primary Examiner* — Jorge Leon, Jr.
(74) *Attorney, Agent, or Firm* — Quinn IP Law

(57) ABSTRACT

A camshaft-drive tensioner system is disclosed for an internal combustion engine having a camshaft-drive element. The camshaft-drive tensioner system includes a tensioner configured to be energized by a pressurized fluid in order to apply a force to the camshaft-drive element. The camshaft-drive tensioner system also includes a fluid pump configured to supply the pressurized fluid. The camshaft-drive tensioner system additionally includes a controller configured to regulate either volume or pressure of the fluid supplied to the tensioner by the fluid pump to thereby selectively vary the force applied to the camshaft-drive element. An internal combustion engine having such a camshaft-drive tensioner system and a method of selectively varying a force applied to the camshaft-drive element are also disclosed.

18 Claims, 3 Drawing Sheets

(56) References Cited

U.S. PATENT DOCUMENTS

| | | | |
|---|---|---|---|
| 2003/0166428 A1* | 9/2003 | Beardmore | F01L 1/02 474/110 |
| 2007/0142146 A1* | 6/2007 | Tryphonos | F01L 1/024 474/111 |
| 2007/0173362 A1* | 7/2007 | Ullein | F01L 1/024 474/140 |

* cited by examiner

VARIABLE TENSIONING FOR ENGINE CAMSHAFT DRIVE

TECHNICAL FIELD

The present disclosure relates to variable tensioning for a camshaft drive in an internal combustion engine.

BACKGROUND

An internal combustion engine typically employs camshaft(s) to open and close the engine's valves in order to control a supply of intake of air to the cylinder for combustion therein and removal of post-combustion gas therefrom. A camshaft-drive element, such as a timing belt or a timing chain, is frequently used to synchronize the rotation of an engine's crankshaft and camshaft(s) so that the engine's valves open and close at proper times during each cylinder's intake and exhaust strokes.

A timing belt usually includes teeth on the surface that contacts camshaft and crankshaft sprockets, while a timing chain typically includes rolling elements for contact with such sprockets. In certain engine designs, the timing belt or chain is also employed to maintain safe running clearance between the engine's valves and pistons. Additionally, in some engine designs the timing belt or chain may be used to drive other engine components, such as a water and/or oil pump.

A tensioner is frequently used in an engine with either the timing belt or chain. Such a tensioner generally applies a force to the timing belt or chain to maintain the belt or chain in tension and, therefore, the rotational timing between the engine's crankshaft and camshaft(s). The tensioner ensures that, independent of the motion of the belt or chain, the connection between the engine's crankshaft and camshaft(s) remains intact, while limiting stress on the related components.

SUMMARY

One embodiment of the disclosure is directed to a camshaft-drive tensioner system for an internal combustion engine having a camshaft-drive element. Such a camshaft-drive element can be a timing belt or a timing chain. The camshaft-drive tensioner system includes a tensioner configured to be energized by a pressurized fluid in order to apply a force to the camshaft-drive element. The camshaft-drive tensioner system also includes a fluid pump configured to supply the pressurized fluid. The camshaft-drive tensioner system additionally includes a controller configured to regulate either a volume or pressure of the fluid supplied to the tensioner by the fluid pump to thereby selectively vary the force applied to the camshaft-drive element.

The camshaft-drive tensioner system may also include a pivotable tensioner arm arranged between the tensioner and the camshaft-drive element. The pivotable tensioner arm may be configured to transmit the force from the tensioner to the camshaft-drive element.

The camshaft-drive tensioner system may additionally include a sensor configured to detect a rotating speed of the engine. In such a case, the controller may be configured to regulate the volume or the pressure of the fluid supplied to the tensioner by the fluid pump in response to the detected rotating speed of the engine. Accordingly, varying the force applied to the camshaft-drive element may be employed to reduce engine friction at lower engine speeds and control vibration of the camshaft-drive element at higher engine speeds. Alternatively, the controller can be programmed to calculate the rotating speed of the engine and regulate the volume of the fluid supplied to the tensioner by the fluid pump in response to thus calculated rotating speed of the engine.

The camshaft-drive tensioner system may additionally include a fluid control valve in operative communication with the controller. The fluid control valve may be configured to vary the volume or the pressure of fluid supplied to the tensioner by the fluid pump.

The controller may be programmed with a lookup table establishing a correspondence between the volume or the pressure of the fluid supplied to the tensioner by the fluid pump and the rotating speed of the engine.

The controller may be programmed to regulate the volume or the pressure of the fluid supplied to the tensioner by the fluid pump such that a first magnitude of the force is applied to the camshaft-drive element up to and including a predetermined detected rotating speed of the engine and a second magnitude of the force is applied to the camshaft-drive element above the predetermined detected rotating speed of the engine.

Another embodiment of the present disclosure is directed to an internal combustion engine having such a camshaft-drive tensioner system.

A further embodiment of the present disclosure is directed to a method of selectively varying a force applied to a camshaft-drive element in an internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
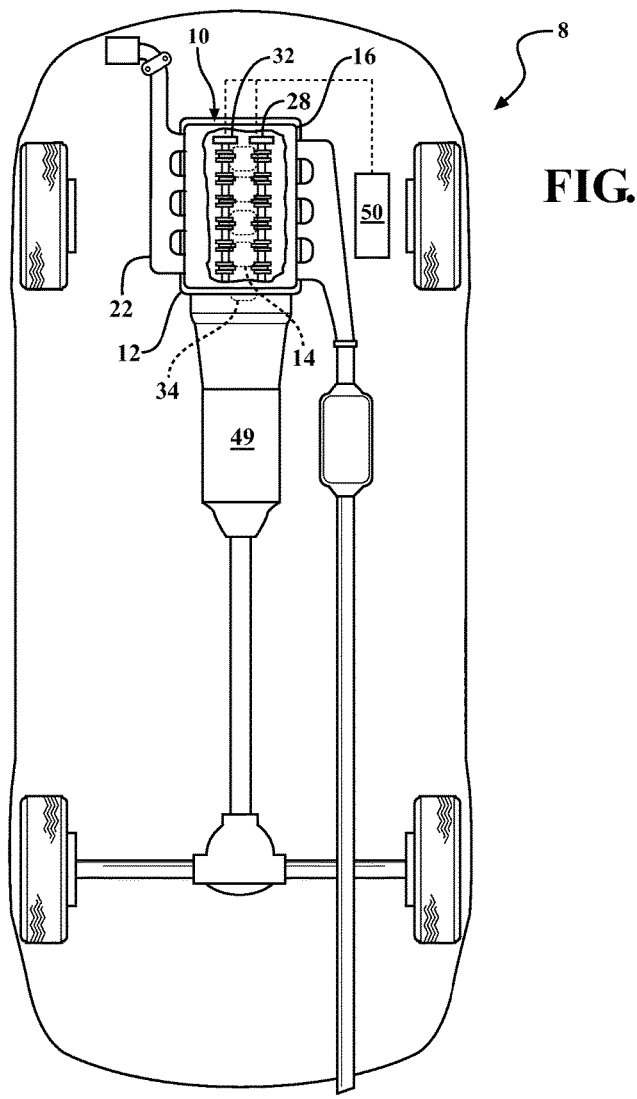
FIG. 1 is a schematic perspective view of a vehicle having an internal combustion engine with a camshaft-drive tensioner system.
Figure 2:
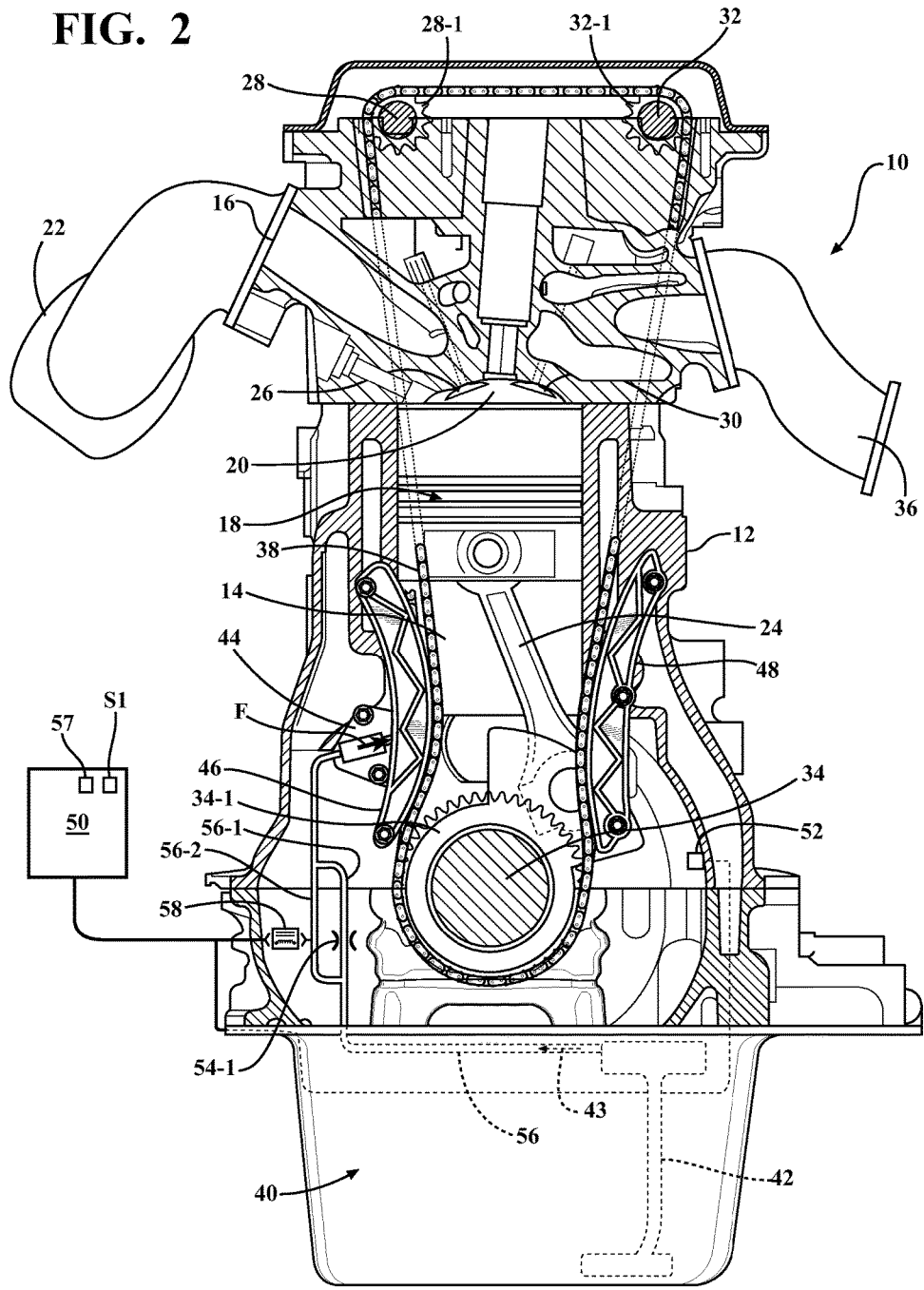
FIG. 2 is a schematic partially cross-sectional front view of the internal combustion engine and the camshaft-drive tensioner system according to one embodiment of the disclosure.

Referring to the drawings, wherein like reference numbers correspond to like or similar components throughout the several figures, FIG. 1 illustrates a motor vehicle 8 having an internal combustion engine 10, such as a spark- or compression-ignition type. As shown in FIGS. 1 and 2, the engine 10 includes a cylinder block 12 with a plurality of cylinders 14 arranged therein and a cylinder head 16 that is mounted on the cylinder block. In the alternative, although not specifically shown, the cylinder head 16 may be integrated into or cast together with the cylinder block 12.

The cylinder head 16 receives air and fuel as a pre-combustion charge to be used inside the cylinders 14 for subsequent combustion. As can be seen in FIG. 2, each cylinder 14 includes a respective piston 18 configured to reciprocate therein. Additionally, combustion chambers 20 are formed within the cylinders 14 between the bottom surface of the cylinder head 16 and the tops of the pistons 18. An airflow is directed through an intake manifold 22 to each of the combustion chambers 20 where fuel is combined with air and to form a fuel-air mixture for subsequent combustion inside the subject combustion chamber. Although an in-line four-cylinder engine is shown in FIGS. 1-2, nothing precludes the present disclosure from being applied to an engine having a different number and/or arrangement of cylinders.

Figure 3:
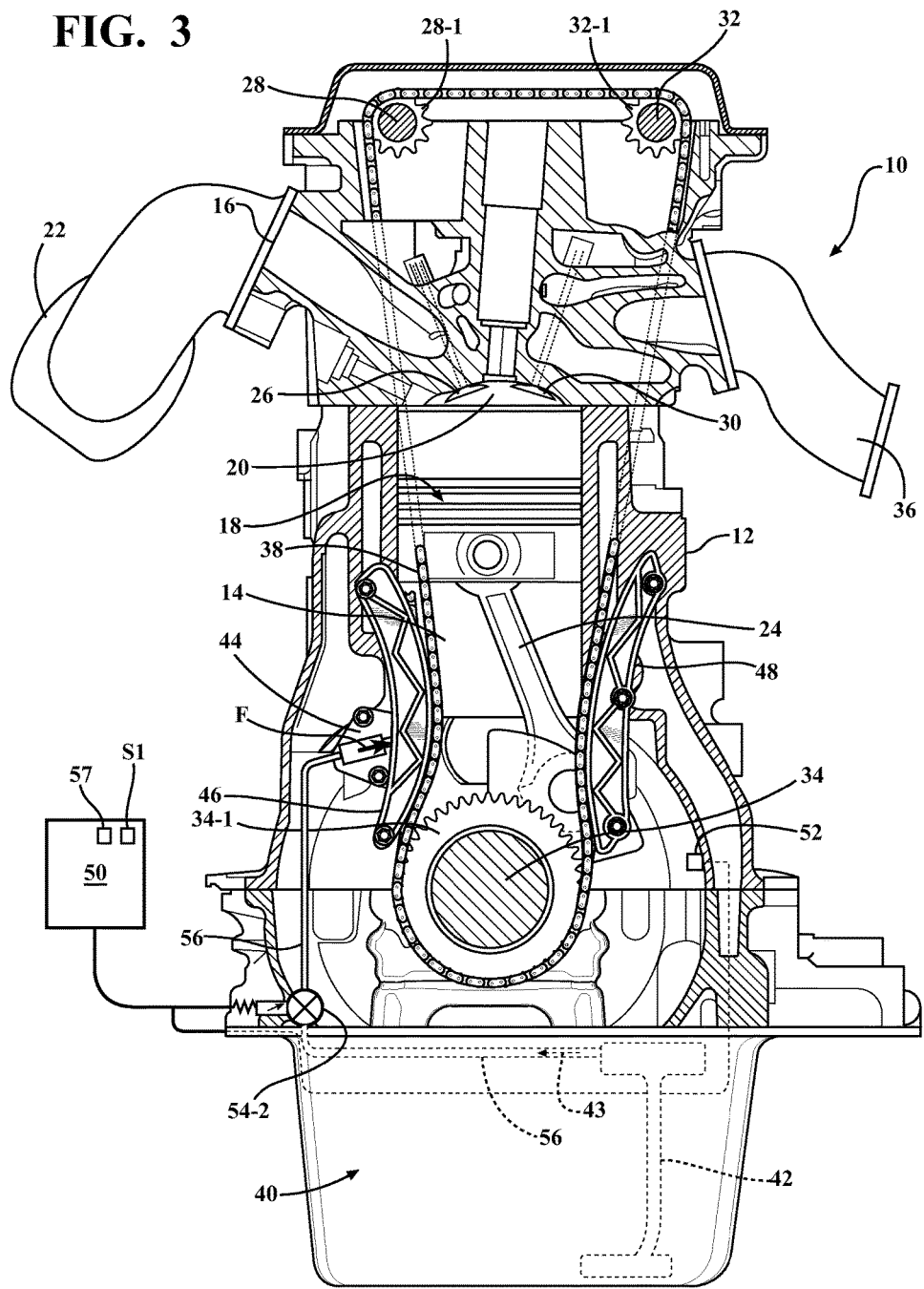
FIG. 3 is a schematic partially cross-sectional front view of the internal combustion engine and the camshaft-drive tensioner system according to another embodiment of the disclosure.

As shown in FIGS. 2-3, the engine 10 also includes a plurality of intake valves 26 operatively connected to the cylinder head 16 and configured to control a supply of air to each cylinder 14 for combustion with fuel therein. An intake camshaft 28 is configured to regulate opening and closing of the respective intake valves 26 during operation of the engine 10. The engine 10 additionally includes a plurality of exhaust valves 30 operatively connected to the cylinder head 16 and configured to control removal of post-combustion gasses from each cylinder 14. An exhaust camshaft 32 is configured to regulate opening and closing of the respective exhaust valves 30 during operation of the engine 10.

The engine 10 also includes a crankshaft 34 configured to rotate within the cylinder block 12. As known to those skilled in the art, the crankshaft 34 is rotated by the pistons 18 via connecting rods 24 as a result of an appropriately proportioned amount of fuel and air being selectively admitted into the combustion chambers 20 via one or more intake valves 26 and burned in the combustion chambers. After the air-fuel mixture is burned inside a specific combustion chamber 20, the reciprocating motion of a particular piston 18 serves to exhaust post-combustion gasses from the respective cylinder 14 via one or more exhaust valves 30. The cylinder head 16 is also configured to exhaust post-combustion gasses from the combustion chambers 20, such as via an exhaust manifold 36.

The intake and exhaust camshafts 28, 32 include respective sprockets 28-1, 32-1, while the crankshaft includes a sprocket 34-1. The engine 10 also includes a camshaft-drive element 38, such as a timing belt (not shown) or a chain (as shown in FIGS. 2-3). The camshaft-drive element 38 operatively connects the respective sprockets 28-1, 32-1, and 34-1 to thereby synchronize rotation of the crankshaft 34 and camshafts 28, 32. As understood by those skilled in the art, synchronized rotation of engine's crankshaft 34 and camshafts 28, 32 via the camshaft-drive element 38 ensures that the valves 26, 30 open and close at proper times during each cylinder's intake and exhaust strokes and may additionally maintain safe running clearance between the valves and pistons 18.

The engine 10 additionally includes a camshaft-drive element tensioner system 40. The camshaft-drive tensioner system 40 includes a fluid pump 42 configured to supply a pressurized fluid 43, such as engine lubrication oil. The fluid pump 42 may be driven mechanically by the engine 10, such as by the crankshaft 34, or via an electric motor (not shown). The fluid pump 42 may be configured to supply oil for lubricating various bearings (not shown) of the engine 10, such as bearings of the crankshaft 34, of the intake and exhaust camshafts 28, 32, and to other engine sub-systems. The camshaft-drive tensioner system 40 also includes a tensioner 44 configured to apply a force F to the camshaft-drive element 38.

The fluid pump 42 supplies a pressurized fluid 43 to the tensioner 44 via a fluid passage 56 that will be discussed in detail below. The tensioner 44 becomes energized by the pressurized fluid 43 from the fluid pump 42 to thereby apply the force F to the camshaft-drive element 38. As shown, a pivotable tensioner arm 46 may be arranged between the tensioner 44 and the camshaft-drive element 38. The tensioner arm 46 is configured to transmit the force F from the tensioner 44 along an extended span of the camshaft-drive element 38, to thereby guide and reduce stress on the camshaft-drive element during operation of the engine 10. A fixed arm 48 can also be employed to guide an opposite side of the camshaft-drive element 38, as shown in FIGS. 2-3.

The force F applied by the tensioner 44 to the camshaft-drive element 38 is intended to maintain predetermined tension in the subject camshaft-drive element and, therefore, the rotational timing between the crankshaft 34 and camshafts 28, 32. The tensioner 44 applies the force F continuously to ensure that motion of the camshaft-drive element 38 remains controlled under various engine speeds. Typical mechanical camshaft-drive tensioners must be adjusted prior to operating the engine, i.e., pre-tensioned, on the engine to provide an appropriate magnitude of the force F whenever, for example, new sprockets 28-1, 32-1, 34-1, a new camshaft-drive element 38, or a new tensioner 44 are installed on the engine. However, the subject tensioner 44, being energized via the pressurized fluid 43 from the pump 42, can be generally regulated via controlling the pressure or volume of the fluid supplied thereto, and may therefore operate as required without such pre-tensioning.

The camshaft-drive tensioner system 40 also includes a controller 50 configured to regulate the pressure or volume of the fluid 43 supplied to the tensioner by the fluid pump 42. The controller 50 may be a dedicated controller for the engine 10, a controller for a powertrain of the vehicle 8 that includes both the engine 10 and a transmission 49, or a central processing unit for an entire motor vehicle. The controller 50 includes a memory, at least some of which is tangible and non-transitory. The memory may be any recordable medium that participates in providing computer-readable data or process instructions. Such a medium may take many forms, including but not limited to non-volatile media and volatile media. Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

Specifically, the controller 50 is programmed to selectively vary the magnitude of the force F applied to the camshaft-drive element 38 by the tensioner 44. The camshaft-drive tensioner system 40 may also include a sensor 52 in operative communication with the controller 50 and configured to detect a rotating speed of the engine 10. Specifically, the sensor 52 may be configured as a proximity sensor for detecting a rotating speed of the crankshaft 34. The controller 50 may be configured to regulate the volume or pressure of the fluid 43 supplied to the tensioner 44 by the fluid pump 42 in response to the rotating speed of the engine 10 detected by the sensor 52. Thus regulated, the volume or pressure of the fluid 43 supplied to the tensioner 44 will vary a magnitude of the force F such that the tension on the camshaft-drive element 38 and the resultant friction detrimental to operating efficiency of the engine 10 can be reduced at lower engine speeds. Additionally, at higher engine speeds, the force F can be increased, to thereby control and minimize vibration of the camshaft-drive element 38.

The camshaft-drive tensioner system 40 may also include a fluid control valve in operative communication with the controller 50. In its various embodiments, the fluid control valve is arranged in fluid communication with each of the fluid pump 42 and the tensioner 44, and is configured to vary the volume or pressure of the fluid 43 supplied to the tensioner by the fluid pump 42 in order to vary the magnitude of the force F. The fluid control valve can be a device that permits selection between two distinct fluid pressures or flows applied to the tensioner 44, or a device permitting an infinitely variable regulation of fluid flow or pressure. Some possible embodiments of the contemplated fluid control valve are discussed in greater detail below.

As shown in FIG. 2, an embodiment of the fluid control valve may be a passive, fixed orifice fluid control valve 54-1 that restricts fluid flow between the fluid pump 42 and the tensioner 44. As shown, down-steam of the fluid pump 42, the fluid passage 56 is split into a first passage 56-1 and a second passage 56-2. The fluid control valve 54-1 is arranged in the first passage 56-1, in fluid communication with each of the fluid pump 42 and the tensioner 44. The second passage 56-2 is arranged fluidly in parallel with the first passage 56-1 and includes a two-position device 58, such as a control solenoid. As shown, the device 58 is arranged in electric communication with the controller 50 to regulate pressure of the fluid 43 supplied to the tensioner 44 on command from the controller.

The device 58 is configured to selectively open the second passage 56-2 to permit fluid flow therethrough, and close the second passage to thereby direct the entire fluid flow through the fluid control valve 54-1 via the fluid passage 56-1. When the second passage 56-2 is closed, the camshaft-drive tensioner system 40 provides a first, low level of fluid flow or pressure at the tensioner 44. On the other hand, when the second passage 56-2 is open via the device 58, a second, increased level of fluid flow or pressure is provided at the tensioner 44. Accordingly, the fluid control valve 54-1 is configured to select between two discrete magnitudes of fluid flow or pressure applied to the tensioner 44 in order to select between two preset magnitudes of the force F.

As shown in FIG. 3, an embodiment of the fluid control valve may be a pulse width modulated (PWM) solenoid valve 54-2 that infinitely varies fluid flow between the fluid pump 42 and the tensioner 44. The solenoid valve 54-2 is arranged in the fluid passage 56 in fluid communication with each of the fluid pump 42 and the tensioner 44, and configured to vary fluid flow to the tensioner 44 from zero to a predetermined maximum available from the fluid pump. As shown, the solenoid valve 54-2 is arranged in electric communication with the controller 50 and configured to regulate pressure of the fluid 43 supplied to the tensioner 44 on command from the controller. The solenoid valve 54-2 is configured to continuously vary the size of the fluid passage 56 and provide infinite control of fluid pressure at the tensioner 44 to thereby select a desired magnitude of the force F.

The controller 50 may be programmed with a lookup table 57 establishing correspondence between the volume and/or the pressure of the fluid 43 supplied to the tensioner 44 by the fluid pump 42 and the rotating speed of the engine 10 as detected by the sensor 52 for the embodiment of FIG. 2. Alternatively, for example in conjunction with the solenoid valve 54-2, the controller 50 may be programmed to regulate the volume or the pressure of the fluid 43 supplied to the tensioner 44 in discrete steps. In such an embodiment, a first magnitude of the force F can be applied to the camshaft-drive element 38 up to and including a predetermined threshold rotating speed S1 of the engine 10, and a second, comparatively higher magnitude of the force F can be applied to the camshaft-drive element above the predetermined detected threshold rotating speed S1. The threshold rotating speed S1 can be predetermined empirically during appropriate testing of the engine 10.

Figure 4:
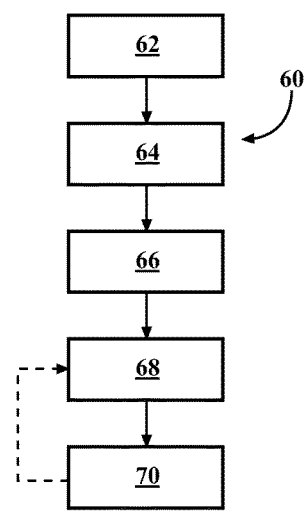
FIG. 4 schematically illustrates, in flow chart format, a method of selectively varying a force applied to a camshaft-drive element in an internal combustion engine shown in FIGS. 1 and 2.

FIG. 4 depicts a method 60 of selectively varying the force F applied to the camshaft-drive element 38 in the internal combustion engine 10, as described above with respect to FIGS. 1-3. Method 60 commences in frame 62 with the engine 10 being started and rotating at some rate, for example at idle speed. From frame 62 the method advances to frame 64. In frame 64 the method includes supplying the pressurized fluid 43 via the fluid pump 42. Following frame 64 the method proceeds to frame 66. In frame 66 the method includes receiving the pressurized fluid 43 via the tensioner 44 to thereby apply the force F by the tensioner to the camshaft-drive element 38. The method then advances to frame 68, where the method includes detecting, via the sensor 52, the rotating speed of the engine 10.

Following frame 68, the method advances to frame 70, where the method includes regulating, via the controller 50, the volume or the pressure of the fluid 43 supplied to the tensioner 44 by the fluid pump 42. Such regulating of the volume or the pressure of the fluid 43 supplied to the tensioner 44 is intended to selectively vary the force F applied to the camshaft-drive element 38 in response to the detected rotating speed of the engine 10. As discussed above with respect to FIGS. 1-3, regulating the volume or pressure of the fluid 43 supplied to the tensioner 44 may be accomplished via controlling the solenoid valve 54-2 embodiment of the fluid control valve. As described above, the solenoid valve 54-2 can be a two-position device that permits selection between two distinct fluid flow volumes to the tensioner 44, or a device permitting an infinitely variable regulation of fluid flow.

In frame 70, the method may include applying the first magnitude F1 of the force F to the camshaft-drive element 38 up to and including the detected predetermined rotating speed S1 of the engine 10 and applying a second magnitude F2 of the force to the camshaft-drive element above the detected predetermined rotating speed of the engine. Alternatively, in frame 70 the method may include regulating the volume or pressure of the fluid 43 supplied to the tensioner 44 via the controller 50 according to the lookup table 57 programmed therein. As described above, the lookup table 57 programmed into the controller 50 establishes the correspondence between the volume and/or pressure of the fluid 43 supplied to the tensioner and the detected rotating speed of the engine. The method 60 is intended to reduce load in the camshaft-drive element 38 at lower engine speeds, e.g., at and below the predetermined threshold rotating speed S1, and control vibration of the camshaft-drive element at higher engine speeds, e.g., above the predetermined threshold rotating speed S1. Following frame 70, the method may loop back to frame 68 for continued detection of the rotating speed of the engine 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A camshaft-drive tensioner system for an internal combustion engine having a camshaft-drive element, the camshaft-drive tensioner system comprising:
    a tensioner configured to be energized by a pressurized fluid and thereby apply a force to the camshaft-drive element;
    a fluid pump configured to supply the pressurized fluid to the tensioner via a fluid passage;
    a control solenoid arranged in the fluid passage, in fluid communication with each of the fluid pump and the tensioner; and
    a controller configured to regulate, via the control solenoid, one of a volume and a pressure of the pressurized fluid supplied to the tensioner by the fluid pump to thereby selectively vary the force applied to the camshaft-drive element;
    wherein the control solenoid is a pulse width modulated (PWM) solenoid valve configured to continuously vary the size of the fluid passage and thereby vary the volume of the pressurized fluid between the fluid pump and the tensioner from zero to a predetermined maximum available from the fluid pump.

2. The camshaft-drive tensioner system according to claim 1, further comprising a pivotable tensioner arm arranged between the tensioner and the camshaft-drive element and configured to transmit the force from the tensioner to the camshaft-drive element.

3. The camshaft-drive tensioner system according to claim 1, further comprising a sensor configured to detect a rotating speed of the engine, wherein the controller is configured to regulate the volume or the pressure of the pressurized fluid supplied to the tensioner by the fluid pump in response to the detected rotating speed of the engine.

4. The camshaft-drive tensioner system according to claim 3, wherein the controller is programmed with a lookup table establishing a correspondence between the volume or the pressure of the pressurized fluid supplied to the tensioner by the fluid pump and the rotating speed of the engine.

5. The camshaft-drive tensioner system according to claim 3, wherein the controller is programmed to regulate the volume or the pressure of the pressurized fluid supplied to the tensioner by the fluid pump such that a first magnitude of the force is applied to the camshaft-drive element up to and including a predetermined detected rotating speed of the engine and a second magnitude of the force is applied to the camshaft-drive element above the predetermined detected rotating speed of the engine.

6. The camshaft-drive tensioner system according to claim 1, further comprising a fixed orifice fluid control valve; wherein:
    the fluid passage is split into a first passage and a second passage;
    the fixed orifice fluid control valve is arranged in the first passage, in fluid communication with each of the fluid pump and the tensioner, and configured to restrict fluid flow between the fluid pump and the tensioner; and
    the second passage is arranged fluidly in parallel with the first passage and includes the control solenoid in electric communication with the controller to regulate pressure of the pressurized fluid supplied to the tensioner on command from the controller.

7. An internal combustion engine comprising:
    a cylinder;
    a piston configured to reciprocate within the cylinder;
    a connecting rod operatively connected to the piston;
    a crankshaft configured to be rotated by the piston via the connecting rod;
    a crankshaft sprocket mounted to the crankshaft;
    a valve configured to control one of a supply of intake of air to the cylinder for combustion therein and removal of post-combustion gas therefrom;
    a camshaft configured to regulate operation of the valve;
    a camshaft sprocket operatively connected to the camshaft;
    a camshaft-drive element operatively connecting the respective crankshaft sprocket and the camshaft sprocket to thereby synchronize rotation of the crankshaft and the camshaft; and
    a camshaft-drive tensioner system configured to apply and selectively vary a force to the camshaft-drive element;
    wherein the camshaft-drive tensioner system includes:
        a tensioner configured to be energized by a pressurized fluid and thereby apply the force to the camshaft-drive element;
        a fluid pump configured to supply the pressurized fluid to the tensioner via a fluid passage;
        a control solenoid arranged in the fluid passage, in fluid communication with each of the fluid pump and the tensioner, wherein the control solenoid is a pulse width modulated (PWM) solenoid valve configured to continuously vary the size of the fluid passage and thereby vary the volume of the pressurized fluid between the fluid pump and the tensioner from zero to a predetermined maximum available from the fluid pump;
        a sensor configured to detect a rotating speed of the engine; and
        a controller configured to regulate, via the control solenoid, one of a volume and a pressure of the pressurized fluid supplied to the tensioner by the fluid pump to thereby selectively vary the force applied to the camshaft-drive element in response to the detected rotating speed of the engine.

8. The internal combustion engine according to claim 7, wherein the camshaft-drive tensioner system additionally includes a pivotable tensioner arm arranged between the tensioner and the camshaft-drive element and configured to transmit the force from the tensioner to the camshaft-drive element.

9. The internal combustion engine according to claim 7, wherein the controller is programmed with a lookup table establishing a correspondence between the volume or the pressure of the fluid supplied to the tensioner by the fluid pump and the detected rotating speed of the engine.

10. The internal combustion engine according to claim 7, wherein the controller is programmed to regulate the volume or the pressure of the fluid supplied to the tensioner by the fluid pump such that a first magnitude of the force is applied to the camshaft-drive element up to and including a predetermined detected rotating speed of the engine and a second magnitude of the force is applied to the camshaft-drive element above the predetermined detected rotating speed of the engine.

11. The internal combustion engine according to claim 7, wherein the camshaft-drive element is a belt or a chain.

12. The internal combustion engine according to claim 7, wherein:
the camshaft-drive tensioner system additionally includes a fixed orifice fluid control valve;
the fluid passage is split into a first passage and a second passage;
the fixed orifice fluid control valve is arranged in the first passage, in fluid communication with each of the fluid pump and the tensioner, and configured to restrict fluid flow between the fluid pump and the tensioner; and
the second passage is arranged fluidly in parallel with the first passage and includes the control solenoid in electric communication with the controller to regulate pressure of the pressurized fluid supplied to the tensioner on command from the controller.

13. A method of selectively varying a force applied to a camshaft-drive element in an internal combustion engine, the method comprising:
supplying a pressurized fluid via a fluid pump;
receiving the pressurized fluid via a tensioner through a fluid passage to thereby apply a force by the tensioner to the camshaft-drive element;
detecting, via a sensor, a rotating speed of the engine; and
regulating, via a control solenoid arranged in the fluid passage, in fluid communication with each of the fluid pump and the tensioner and in operative communication with a controller, one of a volume and a pressure of the pressurized fluid supplied to the tensioner to thereby selectively vary the force applied to the camshaft-drive element in response to the detected rotating speed of the engine;
wherein the control solenoid is a pulse width modulated (PWM) solenoid valve, and wherein said regulating the volume of the pressurized fluid supplied to the tensioner by the fluid pump is accomplished via the PWM solenoid continuously varying the size of the fluid passage and thereby varying the volume of the pressurized fluid between the fluid pump and the tensioner from zero to a predetermined maximum available from the fluid pump.

14. The method according to claim 13, wherein said regulating the volume or the pressure of the pressurized fluid supplied to the tensioner includes applying a first magnitude of the force to the camshaft-drive element up to and including a predetermined detected rotating speed of the engine and applying a second magnitude of the force to the camshaft-drive element above the predetermined detected rotating speed of the engine.

15. The method according to claim 13, wherein the controller is programmed with a lookup table establishing a correspondence between the volume or the pressure of the fluid supplied to the tensioner by the fluid pump and the detected rotating speed of the engine, and wherein said regulating the volume or the pressure of the pressurized fluid supplied to the tensioner is accomplished via the controller according to the lookup table.

16. The method according to claim 13, wherein the camshaft-drive tensioner system additionally includes a pivotable tensioner arm arranged between the tensioner and the camshaft-drive element, and the method further comprising transmitting the force from the tensioner to the camshaft-drive element via the pivotable tensioner arm.

17. The method according to claim 13, wherein the camshaft-drive element is a belt or a chain.

18. The method according to claim 13, further comprising a fixed orifice fluid control valve; wherein:
the fluid passage is split into a first passage and a second passage;
the fixed orifice fluid control valve is arranged in the first passage, in fluid communication with each of the fluid pump and the tensioner, and configured to restrict fluid flow between the fluid pump and the tensioner;
the second passage is arranged fluidly in parallel with the first passage and includes the control solenoid in electric communication with the controller; and
said regulating the pressure of the pressurized fluid supplied to the tensioner by the fluid pump is accomplished via the control solenoid regulating pressure of the pressurized fluid supplied to the tensioner on command from the controller.

* * * * *